Oct. 25, 1927.  A. H. LEIPERT  1,646,755
SPRING SUSPENSION FOR VEHICLES
Filed Sept. 6, 1923
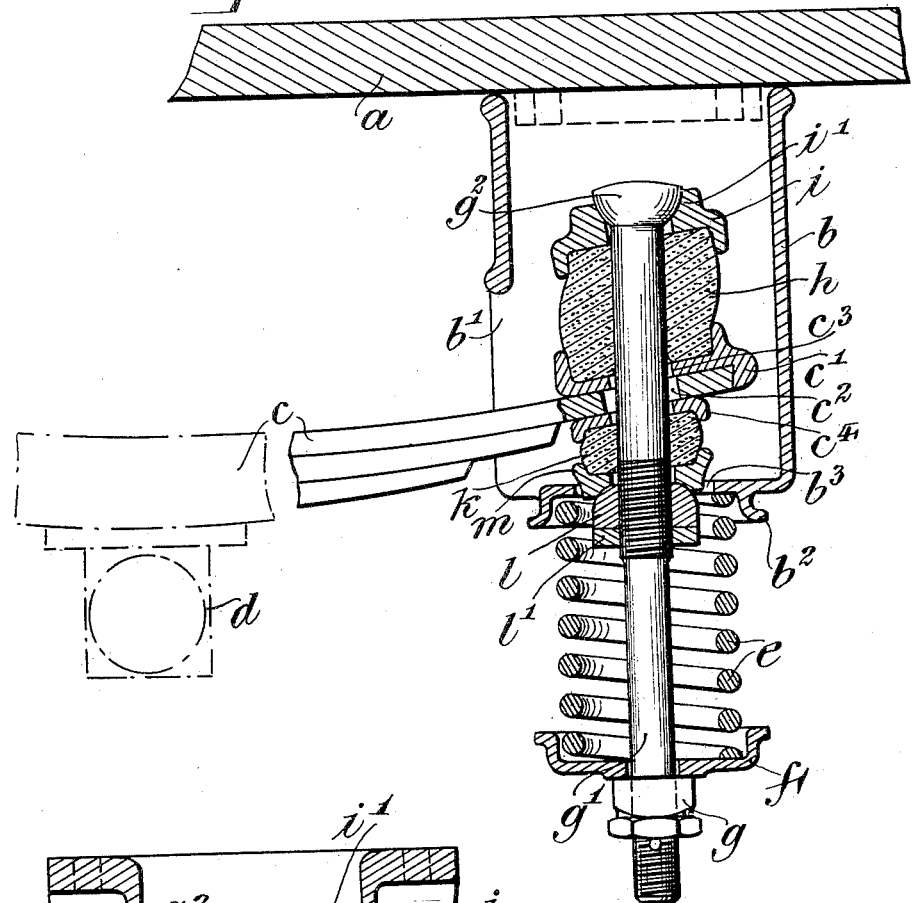
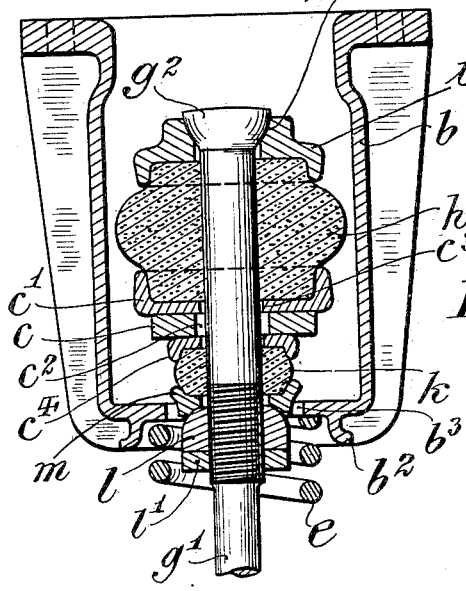
INVENTOR
August N. Leipert
BY
Redding, Greeley, O'Shea & Campbell
ATTORNEYS Patented Oct. 25, 1927.

1,646,755

UNITED STATES PATENT OFFICE.

AUGUST H. LEIPERT, OF NEW YORK, N. Y., ASSIGNOR TO INTERNATIONAL MOTOR COMPANY, OF NEW YORK, N. Y., A CORPORATION OF DELAWARE.

SPRING SUSPENSION FOR VEHICLES.

Application filed September 6, 1923. Serial No. 661,156.

This invention relates to spring suspension for vehicles and is designed primarily with reference to its use in rail cars propelled by internal combustion engines or by other means. The principal object of the invention is to provide a suspension which will afford better riding qualities for rail cars than has been heretofore possible and one in which the connection between the body and the axle shall be of flexible character, free from noise and wear to a great extent and requiring little lubrication. Still another object of the invention is to associate in a spring suspension different types of springs which are mutually co-operative but not directly joined and which themselves co-operate mutually with a non-metallic cushioning material operatively interposed therebetween. More particularly, the invention has to do with a spring suspension in which the loads pass through spiral springs, resilient non-metallic material, and leaf springs to the supporting axle. Still another object of the invention is to provide simple and convenient devices for adjusting the springs and for placing the non-metallic yielding material under compression to the degree desired.

The invention will be described in greater detail with reference to the preferred embodiment illustrated in the accompanying drawing, wherein:

Figure 1 is a view partly in section and partly in side elevation of the improved suspension, a fragment of a vehicle frame to be supported being indicated.

Figure 2 is a view in transverse section through a part of the elements shown in Figure 1 and showing particularly the cushion connection between the springs.

As indicated hereinbefore, the improved suspension may be useful in vehicles of many different types but for convenience will be disclosed in the present application in connection with the suspension of a car adapted to run on rails. This disclosure, by mere reference thereto, will emphasize the improvement in riding qualities to be attained by the invention, by comparison with known suspensions for rail cars. The vehicle to be supported has a part thereof $a$ indicated in section and may carry a suitable casing $b$ within which several of the moving parts are disposed and by which some degree of protection against foreign particles is afforded.

The housing $b$ may be open at one side as indicated at $b'$ to receive the end of a leaf spring $c$ illustrated in the present case as of a conventional semi-elliptic type carried on an axle $d$. The underside of the housing $b$ may carry a centering flange $b^2$ or seat for a coiled spring $e$ which finds an opposed seat on a plate $f$ which may be limited in its movement by a nut $g$ threaded adjustably on a through bolt $g'$ extending upwardly through the bottom wall of the housing $b$ into the housing. The anchorage for the other end of the bolt $g'$ is found in a block $h$ of non-metallic resilient material such as rubber carried on the end of the spring $c$ as by a suitable seat $c'$. A suitable form of anchoring plate for the bolt $g'$ is illustrated as comprising seats $i$ for the block $h$ opposed to the heat $c'$ engaged by an enlarged hemispherical head $g^2$ on the upper end of the bolt, the bolt passing loosely through the plate $i$ and finding a suitable bearing socket $i'$ on its outer face to facilitate angular movement of the bolt $g'$. It will be noted that compactness is contributed to by having the bolt $g'$ pass directly through the end of the spring $c$, an elongated slot $c^2$ being shown and through the spring seats $c'$, a registering opening therein $c^3$ also being illustrated. By the construction thus far described it is evident that the load of the vehicle is carried conjointly by the springs $e$ and $c$ which are interconnected through the resilient non-metallic block $h$ which itself may contribute somewhat to the resiliency of the suspension but, in addition, has the particular virtue of connecting the two springs without the interposition of metal so that wear and noise are eliminated to a great extent and the problem of lubrication reduced. In the most practical form, however, it is desirable to mount a second non-metallic resilient block $k$ operatively between the underside of the spring $c$ and the bolt $g'$ to the end that reverse stresses transmitted from one spring to another will be cushioned. Accordingly, a nut $l$ is threaded on the bolt $g'$ and has its exterior curved somewhat to support through a ball and socket connection a plate $m$ on which the block $k$ is seated, relation of the parts being such as to afford a degree of self-alignment for the bolt $g'$ in its movements. A plate $c^4$ on the underside of the spring $c$ affords a seat for the block $k$ opposed to the first named seat $m$. A lock nut $l'$ may be threaded back of the nut $l$. The nut $l$ not only serves to receive stresses through the cushioning member $k$ for transmission to the bolt $g'$ but more particularly as a means for compressing both the block $k$ and the block $h$ to any desired degree so that they may be placed under an internal static load to increase their resiliency and durability. In the particular relation illustrated it will be seen that the plate $m$ rests just within an opening $b^3$ in the bottom wall of the housing $b$ with ample clearance for angular movements of the bolt $g'$ although this particular relationship is not necessary.

The action and advantages of the new suspension will now be appreciated. The load as transmitted to the axle normally passes through both the coiled spring $e$, the non-metallic cushioning material and the spring $c$. The two springs are interconnected through a non-metallic cushioning means and yet co-operate to give the best riding qualities at all loads. It will be understood that if, for instance, the coiled spring $e$ is less stiff than the spring $c$ it will do most of the work at light loads, but always supplemented by the non-metallic resilient material, whereas, at heavier loads the spring $c$ may contribute appreciably to the resilient suspension along with the spring $e$ and the non-metallic resilient material. Reverse stresses transmitted from one spring to another may be absorbed and cushioned to a great degree by the block $k$. The entire construction is at once simple, accessible, sensitive and readily assembled and disassembled. Free elongation of the spring $c$ is permitted and angular movements of the bolt $g'$ may occur without interference. If, it be assumed that the spring $e$ for any reason failed, the vehicle $a$ might rest directly upon the upper end of the bolt $g'$ in which case the load would be safely and comfortably suspended on the spring $c$ through the non-metallic block $h$.

Changes in design and relationship of parts not involving a change in the principle described may be made without departing from the spirit of the invention recited in the appended claims.

What I claim is:

1. Spring suspension for vehicles comprising in combination a coiled spring to which the load is directly applied under all conditions, a leaf spring on the axle, and non-metallic resilient material interposed operatively between said springs to transmit the load from one to another.

2. Spring suspension for vehicles comprising in combination a relatively sensitive spring on which the load is directly impressed under all conditions, a relatively stout spring carried with the axle and non-metallic resilient material interposed operatively between said springs to transmit the load yieldingly from one to another.

3. Spring suspension for vehicles comprising in combination a spiral spring on which the load is directly impressed, means to support the spring vertically to receive the load, a semi-elliptic leaf spring carried on the axle, a through bolt extending loosely through the coiled spring and through the leaf spring and non-metallic resilient material interposed operatively between said bolt and the leaf spring to transmit the load from the spiral spring thereto.

4. Spring suspension for vehicles comprising in combination a spiral spring on which the load is directly impressed, means to support the spring vertically to receive the load, a semi-elliptic leaf spring carried on the axle, a through bolt extending loosely through the coiled spring and through the leaf spring, non-metallic resilient material interposed operatively between said bolt and the leaf spring to transmit the load from the spiral spring thereto and additional non-metallic resilient material interposed operatively between said bolt and the leaf spring to transmit stresses therebetween in the reverse direction.

5. Spring suspension for vehicles comprising in combination a spiral spring on which the load is directly impressed, means to support the spring vertically to receive the load, a semi-elliptic leaf spring carried on the axle, a through bolt extending loosely through the coiled spring and through the leaf spring, non-metallic resilient material interposed operatively between said bolt and the leaf spring to transmit the load from the spiral spring thereto, and means to permit angular movement of said bolt.

6. Spring suspension for vehicles comprising in combination a resilient element on which the load is directly impressed, means to support the resilient element vertically to receive the load, a semi-elliptic leaf spring carried on the axle, a through bolt extending loosely through the resilient element and through the leaf spring and non-metallic resilient material interposed operatively between said bolt and the leaf spring to transmit the load from the resilient element thereto.

7. Spring suspension for vehicles comprising in combination a resilient element on which the load is directly impressed, means to support the resilient element vertically to receive the load, a semi-elliptic leaf spring carried on the axle, a through bolt extending loosely through the resilient element and through the leaf spring, non-metallic resilient material interposed operatively between said bolt and the leaf spring to transmit the load from the resilient element thereto and additional non-metallic resilient material interposed operatively between said bolt and the leaf spring to transmit stresses therebetween in the reverse direction.

8. Spring suspension for vehicles comprising in combination a resilient spring on which the load is directly impressed, means to support the resilient element vertically to receive the load, a semi-elliptic leaf spring carried on the axle, a through bolt extending loosely through the resilient element and through the leaf spring, non-metallic resilient material interposed operatively between said bolt and the leaf spring to transmit the load from the resilient element thereto, and means to permit angular movement of said bolt.

9. Spring suspension for vehicles comprising in combination a resilient element on which the load is directly impressed, means to support the resilient element vertically to receive the load, a leaf spring carried on the vehicle axle, a through bolt extending loosely through the resilient element and through the leaf spring, a resilient element interposed operatively between the bolt and the leaf spring, and an additional resilient element interposed operatively between the bolt and the leaf spring to cushion the rebound of the vehicle.

This specification signed this 4th day of Sept., A. D. 1923.

AUGUST H. LEIPERT.